Figure 1:
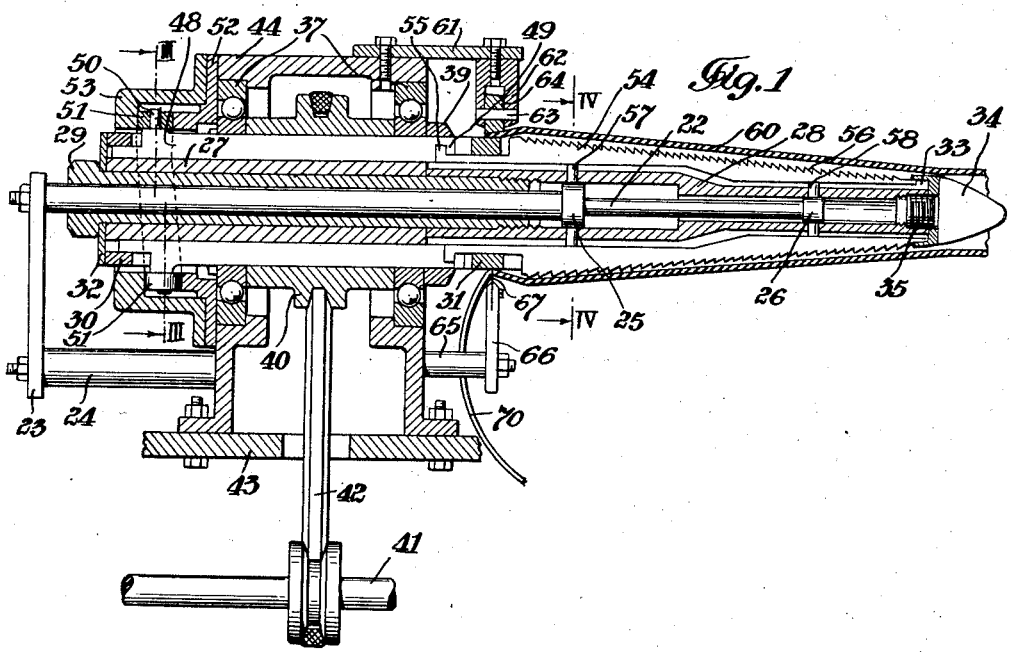

April 28, 1942.   J. BACH   2,280,883
PRODUCTION OF RUBBER THREADS
Filed Dec. 10, 1941

INVENTOR:
John Bach
BY
ATTORNEY

Patented Apr. 28, 1942

2,280,883

UNITED STATES PATENT OFFICE 2,280,883

PRODUCTION OF RUBBER THREADS

John Bach, Budapest, Hungary

Application December 10, 1941, Serial No. 422,379
In Hungary September 25, 1940

4 Claims. (Cl. 164—69)

My invention relates to the production of rubber threads or ribbons, more especially to an apparatus for cutting strips from rubber hose.

It is known that strips can be cut off, along a helical line, from hose made of rubber or of similar materials by means of a pair of scissors. These strips when straightened out will give straight threads or ribbons.

The properties of ribbon, however, make it very difficult to cut rubber in unstretched condition as owing to its resiliency and softness it is liable to give way before the tool and to change its position under the latter, so that even if cutting is successfully achieved the cut surfaces obtained are uneven and fringed. Thus the thread or ribbon obtained is unsuitable for being spun or woven.

According to a well-known process the rubber hose is first brought into a stretched condition by means of a special stretching device, then it is transferred on a cylinder gripped between the centers of a lathe, the cutting being performed by means of a cutting tool displaced axially along the cylinder.

It is a drawback of this process that it requires the employment of a special stretching device, the operation of this device as well as the transfer of the stretched rubber hose on the lathe cylinder being very troublesome; moreover, the capacity of production obtainable by this process is relatively small.

The object of the invention is to overcome this disadvantage and to provide an improved apparatus for cutting strips from rubber hoses.

The main principle of the invention consists therein that the rubber hose is stretched at least about one rotatable body of substantially roundish cross section, which is in contact with a fixed cutting tool. If the body is rotated and the rubber hose is caused to move along the body during rotation towards and under the cutting tool at a uniform feeding speed, a strip of uniform width will be cut off, along a helical line, from the rubber hose by the fixed cutting tool, the width of the strip depending on the rate of the feeding speed during each revolution of the rotating body.

The displacement of the rubber hose during rotation can be achieved in the following manner:

The rubber hose is stretched on a rotatable body in which mechanical shifting means capable of performing an axial vibrating or reciprocating movement are arranged, these shifting means being in contact with the rubber hose. If the body with the rubber hose thereon is rotated and the shifting means are caused to vibrate, the latter will displace the rotating rubber hose along said body towards and below the cutting tool in contact with said body at a substantially uniform feeding speed. In this case, the rate of the feeding speed depends substantially on the frequency of the vibration of the shifting means.

Figure 2:
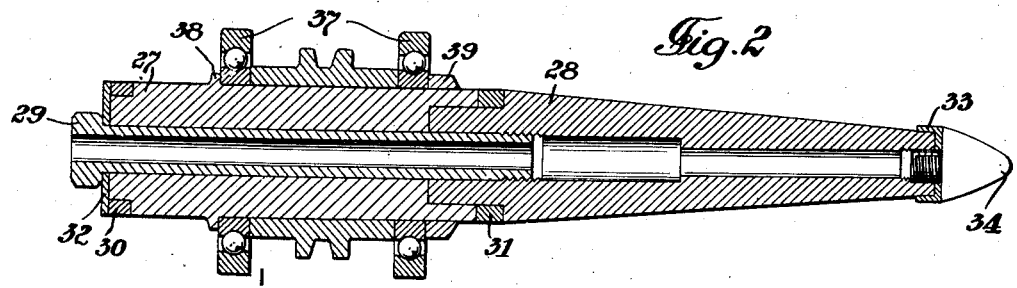
Figure 3:
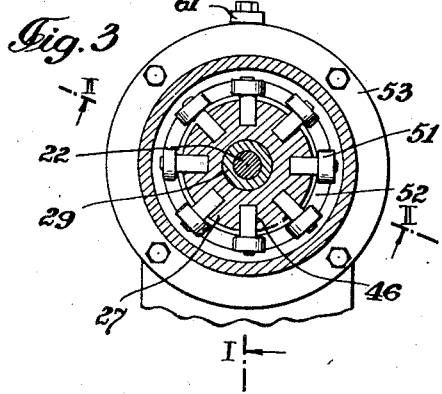
Figure 4:
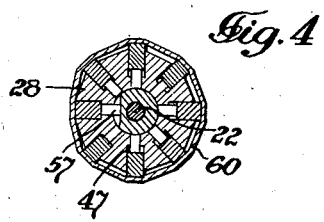

The details and the manner in which the apparatus according to the invention operates shall be more particularly described with reference to the accompanying drawing, showing by way of example and in a diagrammatic manner, an embodiment of my invention, in which:

Fig. 1 is a longitudinal section of an embodiment of the invention on line I—I of Fig. 3, Fig. 2 is a similar section, on line II—II of Fig. 3, showing only the rotating parts of the apparatus, Fig. 3 is a cross section, on line III—III of Fig. 1, and Fig. 4 is a section on line IV—IV of Fig. 1.

Referring to the drawing, the apparatus of the invention comprises a central fixed shaft 22 (Fig. 1), having its right-hand end set-off to a smaller diameter, said shaft being supported, by means of a holding bar 24 and a plate 23, by a casing 44 fixed on a frame 43. Two control discs 25 and 26 (Figs. 1 and 4), each fitted with a circular recess, are mounted on the shaft 22, one at the point of set-off and one at the end of the shaft. The disc 26 is quite similar to the disc 25, but has a smaller size.

The shaft is surrounded by the rotating parts, shown clearly in Fig. 2. These parts consist of a cylindrical sleeve 27 and of another sleeve 28, having a substantially roundish, e. g. octagonal cross section and engaging into the former, the two sleeves being held together by a tubular screw sleeve 29 slid on the shaft 22 and fitting into the bore of the sleeves 27 and 28, an external thread provided on the end of the sleeve 29 being screwed on an internal thread provided in the bore of the sleeve 28. In suitable annular grooves of the sleeve 28 rings 30 and 31 are provided, which, after the sleeve 29 has been screwed-in, are held fixed by the walls of the annular grooves and by a washer 32 supported on the left-hand end of the sleeve 27. On the right-hand cylindrical end of the sleeve 28 a ring 33 is provided, which is kept fixed by a conical hood 34, the bolt 35 of which is screwed into the bore of the sleeve 28. The sleeve 27 has mounted thereon a belt-pulley 40 which is situated between two ball bearings 37 and can be driven through a belt 42 by a driving gear 41. A shoulder 38 of the sleeve 27 and a ring 39 fixed on said sleeve serve for holding the ball bearings fixed in the longitudinal direction. The ball bearings are recessed into appropriate annular grooves of the casing 44.

Each of the two sleeves 27 and 28 is fitted with eight rectangular longitudinal grooves 46 and 47, respectively (Figs. 1, 3 and 4), the grooves 46 being in alignment with the grooves 47. Ledges 48 are provided in the grooves 46 of the sleeve 27. These ledges which can be displaced in their grooves in the longitudinal drection are fitted at their right-hand ends with claws 49, whilst their left-hand ends are set-off. The set-off ends of the ledges 48 are surrounded by the ring 30. The ledges 48 have secured thereto, close to their left-hand ends, bolts 50 carrying guiding rollers 51 which fit into a helical-shaped coercive path, shown in dotted lines in Fig. 4, formed by the curved lateral faces of a guiding ring 52 and of a hood 53. The guiding ring 52 as well as the hood 53 are fixed on the casing 44 by means of bolts. Ledges 54 are provided in the grooves 47 of the sleeve 28. These ledges which can be displaced in their grooves in the longitudinal direction and also, with a certain amount of play, in the radial direction are fitted at their left-hand ends with claws 55 engaging the claws 49 of the ledges 48. The right-hand set-off ends of the ledges 54 are surrounded by the ring 33. The sloping external surfaces of the ledges 54 are fitted with saw-teeth 56. The inner surfaces of the ledges 54, set-off obliquely in their middle part, are supported by short pegs 57 and 58 which, on their part, are supported by the control discs 25 and 26. The ledges 54 are surrounded by a rubber hose 60.

The casing 44 has secured to the upper part thereof a plate 61 which carries a fork-shaped supporting arm 62, in the legs of which a bolt 63, carrying a smoothing roller 64, is fixed. Also carried by the casing 44 is a holding bar 65 supporting a cutting tool holder 66 in which a cutting tool 67 is fixed.

The method of operation of the apparatus described is the following: First of all, a piece of rubber hose 60 is slid on the toothed ledges 54; following this, the pulley 40 is set into rotation by means of the driving gear 41 and the belt 42. The pulley causes the parts shown in Fig. 2, together with the ledges 48 and 54, to rotate. During this rotation the guiding rollers 51 roll along their helical-shaped coercive path and thereby impart a reciprocating axial motion to the ledges 48 as well as to the ledges 54 engaging the latter. The rotating toothed ledges 54 moving towards the left carry along with them the hose which rotates likewise, and cause said hose to pass over the fixed cutting tool 67 which will continuously cut off an endless strip 70 of uniform width from the hose 60.

The width of the strip depends on the feeding speed, which latter again depends on the pitch of the helical-shaped coercive path.

In order to prevent the feeding motion of the hose being impeded by the ledges 54 sliding back, the control discs 25 and 26 are fitted with circular recesses, into which the holding pegs 57 and 58 of the ledge 54, which is just sliding back, catch and thus cause this ledge to fully drop into its groove 47. At this point the hose will come to be placed, during the short period of control, on the sleeve 28 (Fig. 4) which will not impede the feeding motion of the hose.

The helical-shaped coercive path may, for instance, be constructed in such a manner that the feeding motion of the ledges 54 occupies, during a whole revolution, 300 degrees, whilst their return motion occupies 60 degrees of the circle. In order to achieve this, the side walls of the ring 52 and of the hood 48 are constructed in such a manner as to follow a helix over five-sixths of a circle and then to return, over one-sixth of the circle, to their initial point. In accordance herewith the recesses of the control discs 25 and 26 are also constructed with an opening of about 60 degrees. If the control discs are slightly turned from their position shown in Fig. 4, this will cause the feed to be diminished because the ledge 54 which is just sliding back will, during a part of its return motion, draw the hose slightly back. This does not interfere with the feeding motion of the other ledges because the rubber hose is elastic and some parts of its circumference lie free. Accordingly, the rotation of the control discs offers a possibility for regulating the feed of the hose.

Finally, the purpose of the smoothing disc 64 is to cause that part of the hose which just leaves the ledges 54 to be pressed down on the ring 31. However, according to tests carried out, this smoothing disc can, in many cases, be omitted.

I wish it to be understood that I do not desire to be limited to the exact details of construction shown and described, for obvious modifications will occur to a person skilled in the art.

I claim:

1. Apparatus for cutting strips from rubber hoses, which comprises a rotatable body of substantially roundish cross-section, a rubber hose stretched around said body, a fixed cutting tool in contact with said body, means for rotating said body with the rubber hose thereon, mechanical shifting means arranged in said body in contact with the rubber hose thereon and means for causing the shifting means to vibrate axially during the rotation of the body, the vibrating shifting means causing the rubber hose to move along said body towards and below the cutting tool at substantially uniform speed, and thereby causing the cutting tool to cut a strip of substantially uniform width from the rubber hose.

2. Apparatus as claimed in claim 1, which comprises means for causing the shifting means to get out of contact with the rubber hose during their backward movement.

3. Apparatus for cutting strips from rubber hoses, which comprises a fixed shaft, a rotatable cylindrical sleeve surounding said shaft, another rotatable cone-like sleeve surrounding said shaft and rigidly connected with the cylindrical sleeve, longitudinal grooves being provided in both sleeves in alignment with each other, a rubber hose stretched around the cone-like sleeve, a fixed cutting tool in contact with the cone-like sleeve, means for rotating both sleeves around said shaft, ledges arranged in the grooves of the cylindrical sleeve, toothed ledges arranged in the grooves of the cone-like sleeve in contact with the rubber hose thereon and being operatively connected with the first-named ledges, guiding rollers mounted on the first-named ledges and fitting into a coercive path, for causing these ledges, together with the toothed ledges, to vibrate axially during the rotation of the sleeves, the vibrating toothed ledges causing the rubber hose to move along the cone-like sleeve towards and below the cutting tool at substantially uniform speed, and thereby causing the cutting tool to cut a strip of substantially uniform width from the rubber hose.

4. Apparatus as claimed in claim 3, which comprises means for causing the toothed ledges to get out of contact with the rubber hose during their backward movement, these means comprising control discs with a curved recess, mounted on said shaft, several pegs in contact with these discs, being slidably arranged in the cone-like sleeve in the radial direction and supporting the toothed legs, said pegs one after the other catching into the recesses of the discs during the rotation of the sleeves and thereby causing the respective toothed ledges to release the rubber hose.

JOHN BACH.